UNITED STATES PATENT OFFICE.

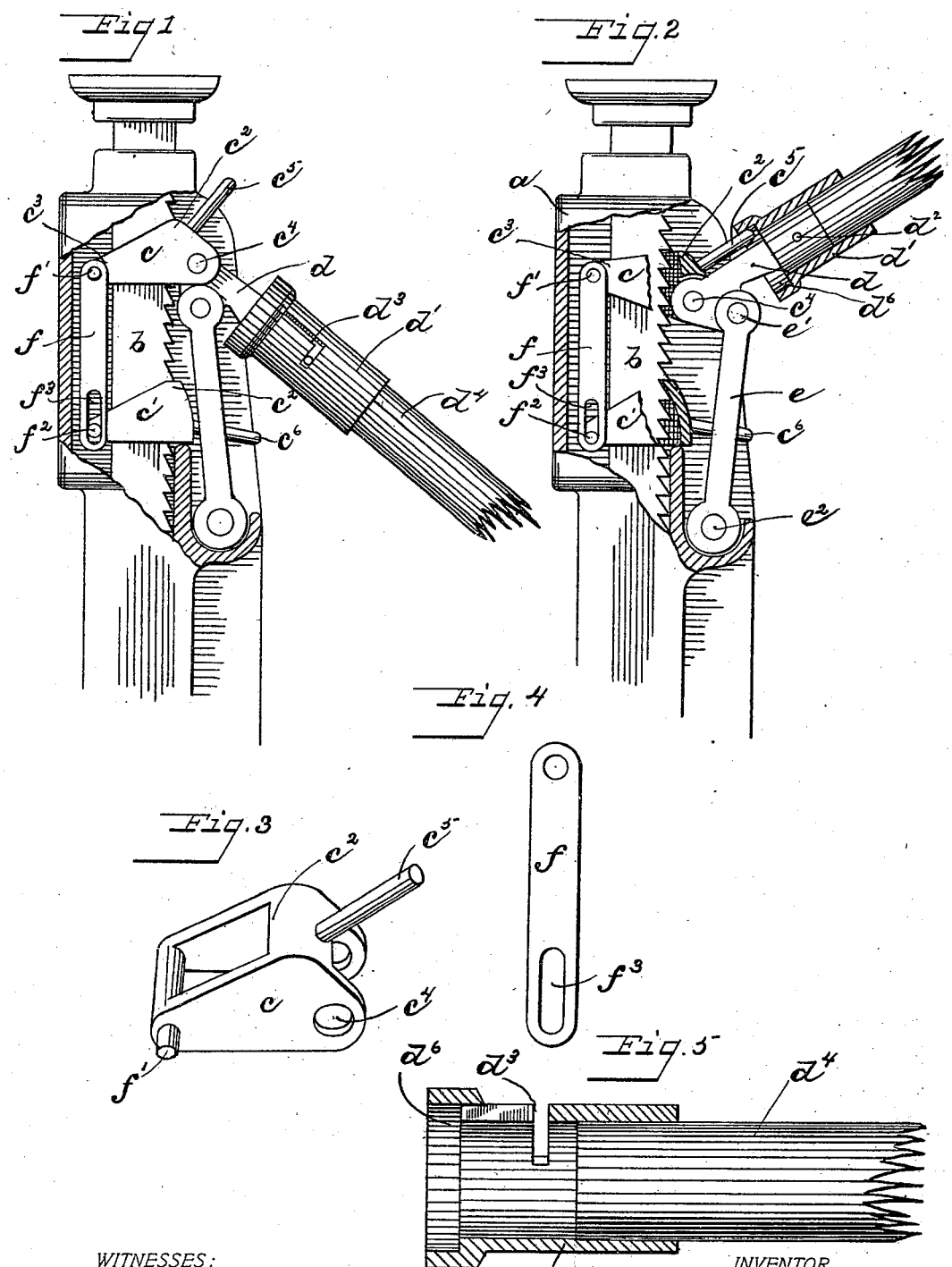

WALTER G. WUICHET, OF DAYTON, OHIO, ASSIGNOR TO THE PASTEUR-CHAMBERLAND FILTER COMPANY, OF SAME PLACE.

LEVER-JACK.

SPECIFICATION forming part of Letters Patent No. 684,031, dated October 8, 1901.

Application filed March 22, 1901. Serial No. 52,342. (No model.)

*To all whom it may concern:*

Be it known that I, WALTER G. WUICHET, a citizen of the United States, residing at Dayton, in the county of Montgomery and State of Ohio, have invented certain new and useful Improvements in Lever-Jacks, of which the following is a specification.

My invention relates to lifting-jacks, and more particularly to what are known as "lever-jacks."

The object of my invention is to improve on the construction shown in Patent No. 637,494, granted November 21, 1899, to D. K. Allison, and especially relates to a tripping device. I attain this object by the construction shown in the accompanying drawings, in which—

Figure 1 is a side elevation of a jack with the casing or standard partly broken away, showing my invention with the lifting-lever depressed in position to be operated for lifting. Fig. 2 is a side view, partly in section, with the lever and socket in position for tripping. Fig. 3 is a lifting-dog. Fig. 4 is the connecting-link between the dogs, and Fig. 5 is the socket for the lever.

Like parts are represented by similar letters of reference in the several views.

In constructing my device I employ the casing or standard $a$, with the rack-bar $b$ slidingly mounted in same. The dogs $c$ and $c'$ on the rack-bar $b$ are formed at $c^2$ to act as pawls on the rack, with their other ends $c^3$ engaging the opposite side of the bar at a lower elevation, so that when the pawls are operated the weight of the end $c^3$ will keep the pawls normally in engagement with the teeth of the rack. To the upper or lifting dog $c$ there is pivoted at $c^4$ the lever $d$, which is formed to fit in the socket $d'$ and has a pin $d^2$ thereon to move in the bayonet-slot $d^3$ of the socket. The other end of the socket $d'$ receives the wooden lever $d^4$. The link $e$ is pivoted to the lever $d$ at $e'$ and to the standard $a$ at $e^2$ and is slotted longitudinally, so as to permit the operation of the handle $c^6$, extending through the same. The handle $c^5$ on the dog $c$ and the handle $c^6$ on the dog $c'$ are used to tip the dogs, so as to alternately free the pawls $c^2$ from engagement with the teeth of the rack when it is necessary to lower the bar tooth by tooth; but when it is not necessary to slowly lower the jack in this way I provide for the quick drop of the bar in one movement, as follows: In the ordinary operation of the rack-bar to lift or lower the same the handle $c^5$ is clear of the socket $d'$; but to quickly drop the rack-bar its full length the lever $d^4$ and the socket $d'$ and the lever $d$ are elevated, the socket turned, so that the pin $d^2$ is free to move longitudinally in the bayonet-slot $d^3$, when the socket may be pulled out and pushed back, so that the cup $d^6$ will engage the handle $c^5$, as shown in Fig. 2. Then by depressing the lever it will carry the handle $c^5$ with it, thereby tipping the dog $c$ and releasing its pawl, and by reason of the link $f$, pivoted at $f'$ to the dog $c$ and at $f^2$ to the dog $c'$, the dog $c'$ is also tipped and its pawl is disengaged from the teeth of the rack. It will be seen that the pawls of each dog are disengaged from the teeth of the rack at the same time and the rack-bar is permitted to drop its full length. The slot $f^3$ in the link $f$ where it is pivoted to the dog $c'$ gives sufficient play so that in the ordinary operation of the jack to lift and lower the bar the link will not tip the dog $c'$ so as to throw its pawl out of engagement with the teeth of the rack.

Having thus described my invention, I claim—

1. In a lifting-jack, the combination with the rack-bar, of a lifting-dog having a pawl formed thereon to engage said rack-bar, a handle and an operating-lever pivoted to said dog, and an interengaging part between said handle and lever, whereby, through the operation of said lever beyond its movement for lifting, said handle is moved to throw said pawl out of engagement with the teeth of the rack-bar, substantially as specified.

2. In a lifting-jack, the combination with the rack-bar, of a lifting-dog having a pawl thereon adapted to normally engage the teeth of the rack-bar, a handle and an operating-lever pivoted to said dog, and a movable socket on said lever to engage with said handle when said lever is operated beyond its movement for lifting, whereby said handle is moved to throw said pawl out of engagement with the teeth of the rack-bar, substantially as specified.

3. In a lifting-jack, the combination with the rack-bar, of a lifting and retaining dog, each of said dogs being formed with pawls to engage with the teeth of said rack, an operating-lever pivoted to said lifting-dog, a handle on each of said dogs, and interengaging parts between said dogs and between said lever and lifting-dog, whereby, through the operation of said lever beyond its movement for lifting, the pawl on each of said dogs will be thrown out of engagement with the teeth of the rack-bar, substantially as specified.

In testimony whereof I have hereunto set my hand this 19th day of March, A. D. 1901.

WALTER G. WUICHET.

Witnesses:
ROBERT C. KENNEDY,
MAMIE G. BOYER.